US007694877B2

(12) United States Patent
Hemming et al.

(10) Patent No.: US 7,694,877 B2
(45) Date of Patent: Apr. 13, 2010

(54) CONTROL SYSTEM FOR A BANKNOTE HANDLER

(75) Inventors: Jonas Hemming, Borås (SE); Hans-Henry Almqvist, Torslanda (SE)

(73) Assignee: Unjo AB, Mölndal (SE)

( * ) Notice: Subject to any disclaimer, the term of this patent is extended or adjusted under 35 U.S.C. 154(b) by 860 days.

(21) Appl. No.: 10/585,690

(22) PCT Filed: Jan. 7, 2005

(86) PCT No.: PCT/SE2005/000009

§ 371 (c)(1),
(2), (4) Date: Jul. 10, 2006

(87) PCT Pub. No.: WO2005/066903

PCT Pub. Date: Jul. 21, 2005

(65) Prior Publication Data

US 2008/0283450 A1 Nov. 20, 2008

(51) Int. Cl.

*G06Q 40/00* (2006.01)
*G07D 11/00* (2006.01)
*G07F 19/00* (2006.01)
*G06K 5/00* (2006.01)
*G06K 13/00* (2006.01)

(52) U.S. Cl. ........................ 235/379; 235/380; 235/475

(58) Field of Classification Search ................. 235/379, 235/380, 475; 705/43; 209/534

See application file for complete search history.

(56) References Cited

U.S. PATENT DOCUMENTS 3,608,690 A * 9/1971 Morrow et al. .............. 194/206

(Continued)

FOREIGN PATENT DOCUMENTS

EP 0795842 9/1997
WO 03052080 6/2003
WO 03052700 6/2003

*Primary Examiner*—Daniel Walsh
(74) *Attorney, Agent, or Firm*—Dykema Gossett PLLC

(57) ABSTRACT

The present invention relates to a device for handling banknotes, comprising a transporting system (1), an infeeding and outfeeding unit (2), an identifying unit (3) as well as a first, second and so on to a last storage unit (41, 42, . . . , 4*n*), each one adapted to the storage of banknotes. The device is adapted to an infeed of a banknote through the infeeding and outfeeding unit (2), a transportation of the banknote by means of the transporting system (1) past the identifying unit (3), an identification of the banknote, a transportation of the banknote to a storage unit intended for the banknote according to the identification, as well as an infeed of the banknote to the intended storage unit. Particularly, it is taught that the device comprises a central control unit (5), adapted to communicate with a first local control unit (51) arranged at the first storage unit (41,) a second local control unit (52) arranged at the second storage unit (42) and so on to a last local control unit (5*n*) arranged at the last storage unit (4*n*). The central unit (5) is further adapted to communicate with a position sensor (6) as well as the identifying unit (3). The respective control unit (5, 51, 52, . . . , 5*n*) has a common synchronous apprehension of the position of the transporting system 1, and when the identifying unit (3) has identified a banknote, and when the position sensor (6) has indicated the position of the banknote in the transporting system (1), the central control unit (5) communicates the position of the banknote to the intended local control, unit (52), which directs the storage unit (42) associated therewith to an infeed, being independent of other units, of the banknote to the storage unit (42) when the position in the transporting system (1) reaches the intended storage unit (42).

20 Claims, 2 Drawing Sheets

U.S. PATENT DOCUMENTS 4,179,685 A * 12/1979 O'Maley .................... 382/135
4,365,700 A * 12/1982 Arimoto et al. ............. 194/206
4,511,794 A * 4/1985 Imamichi .................... 235/379
4,552,350 A * 11/1985 Nagy et al. ................ 271/3.19
4,736,852 A * 4/1988 Edin et al. .................. 209/534
4,744,468 A * 5/1988 Goi et al. .................... 209/534
4,745,266 A * 5/1988 Miura ........................ 235/379
4,775,783 A * 10/1988 Sasaki et al. ................ 235/379
4,988,849 A * 1/1991 Sasaki et al. ................ 235/379
5,071,031 A * 12/1991 Yuge et al. ..................... 221/3
5,076,441 A * 12/1991 Gerlier ....................... 209/534
5,335,484 A * 8/1994 Hain ........................... 53/582
5,436,435 A * 7/1995 McMillan ................... 235/379
5,719,383 A * 2/1998 Forrest ....................... 235/379
6,006,989 A * 12/1999 Ademmer et al. ........... 235/379
6,012,565 A * 1/2000 Mazur ........................ 194/207
6,131,809 A * 10/2000 Drescher et al. ............ 235/379
6,422,458 B1 * 7/2002 Katou et al. ................ 235/379
6,481,620 B1 11/2002 Katou et al.
6,640,156 B1 * 10/2003 Brooks et al. ............... 700/213
6,659,258 B2 * 12/2003 Otsuka ....................... 194/206
7,407,090 B2 * 8/2008 Jantsch ....................... 235/379
2002/0033359 A1 * 3/2002 Graef et al. ................. 209/534
2002/0092905 A1 * 7/2002 Katou et al. ................ 235/379
2002/0121422 A1 * 9/2002 Shibata et al. .............. 194/206
2002/0153290 A1 * 10/2002 Otsuka ....................... 209/534
2002/0153291 A1 * 10/2002 Otsuka ....................... 209/534
2002/0173874 A1 * 11/2002 Lax ............................ 700/223
2002/0185531 A1 * 12/2002 Matzig ....................... 235/382
2003/0121077 A1 * 6/2003 Katou et al. .................. 902/12
2004/0164147 A1 * 8/2004 Jenkins et al. .............. 235/382
2004/0172730 A1 * 9/2004 Washington et al. ........... 902/6
2005/0127163 A1 * 6/2005 Minamishin et al. ........ 235/379
2005/0263582 A1 * 12/2005 Yokoi et al. ................. 235/379
2007/0205260 A1 * 9/2007 Tennant ...................... 235/379
2007/0221469 A1 * 9/2007 Katou et al. ................ 194/206
2008/0283450 A1 * 11/2008 Hemming et al. ........... 209/534

* cited by examiner

CONTROL SYSTEM FOR A BANKNOTE HANDLER

TECHNICAL FIELD

The present invention relates to a device for handling banknotes, which could constitute a part of, for instance, an automatic or manual cash register, an automatic teller machine or a change-giving machine.

The present invention relates more specifically to a control system for a device for handling banknotes as well as miscellaneous computer programme products and a computer-readable medium having computer programme code that is adapted to a control of a device according to the invention.

PRIOR ART

Patent publication WO 03/053700 shows a device for the receipt and distribution of cash. This device comprises a transporting system, an infeeding and outfeeding unit arranged along the transporting system, which unit is adapted to the infeed and outfeed of banknotes, as well as an identifying unit arranged along the transporting system. Furthermore a first, second and so on to a last storage unit, being arranged along the transporting system, are shown, each one adapted to the storage of banknotes of different denominations.

The device is adapted to an infeed of a banknote through the infeeding and outfeeding unit, a transportation of the banknote by means of the transporting system past the identifying unit, an identification of the banknote by means of the identifying unit, a transportation of the banknote to a storage unit intended for the banknote according to the identification, as well as an infeed of the banknote to the intended storage unit from the transporting system.

SUMMARY OF THE PRESENT INVENTION

Technical Problems

The present invention is particularly adapted to a co-operation with a device according to patent publication WO 03/053700, but it should be appreciated that there is nothing that prevents the present invention from being applied in connection with other devices for a handling of banknotes that act according to the conditions of the present invention.

Considering prior art, such as it has been described above, it is a technical problem to handle banknotes as near each other as possible in the transporting system with preserved function and precision of the device.

It is a technical problem to be able to run the transporting system at high speed and simultaneously keep the function and precision of the device.

It is a technical problem to present a device that readily and without major interventions in the control and regulating system can be rescaled to different numbers of storage units depending on how many different denominations of banknotes the device should be able to handle.

It is also a technical problem to be able to handle banknotes in a transporting system having different storage units without subjecting the banknotes as well as the transporting system to wear.

The Solution and Advantages

On the basis of a device for handling banknotes, comprising a transporting system, an infeeding and outfeeding unit arranged along the transporting system, which unit is adapted to the infeed and outfeed of banknotes, an identifying unit as well as a first, second and so on to a last storage unit, each one adapted to the storage of banknotes, with the device being adapted to an infeed of a banknote through the infeeding and outfeeding unit, a transportation of the banknote by means of the transporting system past the identifying unit, an identification of the banknote by means of the identifying unit, a transportation of the banknote to a storage unit intended for the banknote according to the identification, as well as an infeed of the banknote to the intended storage unit from the transporting system, the present invention teaches that the device comprises a central control unit, adapted to communicate with a first local control unit arranged at the first storage unit, a second local control unit arranged at the second storage unit and so on to a last local control unit arranged at the last storage unit.

Furthermore, the central control unit is adapted to communicate with a position sensor, as well as the identifying unit.

The present invention teaches particularly that the central and the respective local control unit have a common synchronous apprehension of the instantaneous position of the transporting system.

When a banknote is inserted in the device, it is transported through the device by the transporting system. This brings the banknote past the identifying unit, which makes it possible for the identifying unit to identify the banknote. The banknote also passes the position sensor, whereby the position of the banknote in the transporting system can be determined.

When the central control unit has been informed about the identity of the banknote as well as the position thereof, the position is communicated to the local control unit intended for the identified banknote.

This local control unit directs the storage unit associated therewith to an infeed, being independent of other units, of the banknote from the transporting system to the storage unit when the banknote reaches the intended storage unit. The independent handling of the banknote by the local storage unit substantially decreases the requirements on the capacity of the central control unit to handle time-critical information.

The only time critical requirement that exists is that the communication between the central control unit and intended local control unit should take place before the banknote reaches the first storage unit, so that the first local control unit has the time to get requisite information from the central control unit in order to be able to direct and check the first storage unit if the banknote in question should be stored there. However, this is not a difficult requirement to meet, even a communication link having low bandwidth meets these requirements.

In the case when an outfeed of a banknote should be effected from the device, the present invention teaches that the central control unit is adapted to communicate to the local control unit associated with the storage unit storing the banknote to be fed out that the banknote should be fed out to the transporting system. On that occasion, the local control unit directs the storage unit associated therewith to an outfeed of the banknote to the transporting system, the banknote is then transported by means of the transporting system to the infeeding and outfeeding unit, which feeds out the banknote from the transporting system and out of the device.

In the case when the identifying unit is incapable of identifying a fed-in banknote with a particular certainty, the banknote is transported by means of the transporting system to the infeeding and outfeeding unit, and then the infeeding and outfeeding unit feeds out the unidentified banknote from the transporting system and out of the device.

According to a preferred embodiment, the infeeding and outfeeding unit is adapted to feed in each banknote to the transporting system that is inserted in the device, and to feed out each banknote from the transporting system that, by means of the transporting system, reaches the infeeding and outfeeding unit.

The present invention teaches that the transporting system can be adapted to reverse back a banknote past the identifying unit for at least one additional transportation past the identifying unit for an identification before the identifying unit is regarded to be incapable of identifying the banknote.

According to an alternative embodiment, an infeeding and outfeeding control unit is adapted to communicate with the central control unit. This infeeding and outfeeding control unit is arranged at the infeeding and outfeeding unit, and it has an apprehension of the position of the transporting system that is common to and synchronous with other control units.

When a banknote is to be fed out from the device according to this embodiment, the central control unit is adapted to communicate to the local control unit associated with the storage unit that stores the banknote and to the infeeding and outfeeding control unit a position of the banknote in the transporting system. The local control unit directs the storage unit associated therewith to an outfeed of the banknote to the transporting system in this position, and then the banknote is transported by means of the transporting system to the infeeding and outfeeding unit. The infeeding and outfeeding control unit then directs the infeeding and outfeeding unit to an outfeed of the banknote from the transporting system and out of the device in this position.

This embodiment also allows a banknote to be permitted to be transported around a plurality of turns in the transporting system, and accordingly a plurality of times past the identifying unit, for identification before the identifying unit is regarded to be incapable of identifying the banknote.

This embodiment also allows the central control unit, upon an infeed of a banknote to the transporting system by means of the infeeding and outfeeding unit, to be adapted to communicate a position of the infeed to the transporting system to the infeeding and outfeeding control unit. On that occasion, the infeeding and outfeeding control unit can direct the infeeding and outfeeding unit to an infeed of the banknote into the device and to the transporting system in this position.

According to a proposed embodiment, the central control unit can comprise a central index, which comprises a record of each position associated with the transporting system, which index can be adapted to contain information about whether the respective position in the transporting system carries a banknote or not.

The present invention also teaches that the transporting system is allocated positional locations of a mutual distance that in any position permits a transportation of at least a banknote being largest in physical size of the banknotes that may be present in the handling of banknotes.

With the intention to present a system that does not cause a mechanical wear on the banknotes being handled, the present invention teaches that the infeeding and outfeeding unit and the respective storing unit are adapted to an infeed and outfeed of banknotes taking place synchronously with the motion of the transporting system.

The present invention teaches a number of different quality assuring functions of the device.

Among other things, the central control unit is adapted to be able to read the apprehension of the respective control unit regarding the position of the transporting system, which reading may constitute a part of a performance inspection carried out upon a stationary transporting system.

An initiation of the device can be effected by the fact that the central control unit is adapted to communicate a reference position of the transporting system to all other control units upon a stationary transporting system.

An update of the device can be effected by the fact that a current position of the transporting system is communicated to all control units upon a new position of the transporting system, where this current position can be communicated upon a transporting system in motion. Since this update takes place with a transporting system in motion, and in order to preserve a synchronous transfer of this update value, the same communication takes place autonomously.

The present invention teaches that the central control unit is adapted to communicate the identical numerical value of the position of the transporting system to all local control units upon the initiation and the update, and that the central control unit is adapted to calculate and communicate relative position readings adapted to the respective local storage unit upon the indication of the position of a banknote in the transporting system.

The method of the invention of handling position readings and communicate these during the time it takes to transport a banknote allows the central control unit to communicate with other control units by means of a common data link having low bandwidth requirements.

With the intention of allowing a handling of relative positional locations that exceed a number of turns around the transporting system, the present invention teaches that the respective control unit comprises an index that is adapted to be incremented in order to always represent the current position of the transporting system, that the respective index is adapted to handle positions that exceed a number of turns around the transporting system, that, when the respective index is incremented from the maximum value thereof, the respective index gets the value of 0 (zero), and that all calculations are made modulo the maximum value of the respective index+1, which entails that position distances above wrap around do not constitute any problem.

Furthermore, the present invention teaches that the instantaneous position of the transporting system in operation is communicated to the respective control unit by means of a transfer mechanism adapted to utilize two signals in quadrature. A third signal is used for the zero setting of the respective index upon an initiation of the device.

The present invention also comprises a number of computer programme products whereby a device according to the invention can be realised.

A first computer programme product comprises computer programme code that, when it is executed by a computer, brings the same to act as a central control unit according to the invention.

A second computer programme product comprises computer programme code that, when it is executed by a computer, brings the same to act as a local control unit according to the invention.

A third computer programme product comprises computer programme code that, when it is executed by a computer, brings the same to act as an infeeding and outfeeding control unit according to the invention.

The present invention also comprises a computer-readable medium on which computer programme code according to the first, second or third computer programme product is stored.

The advantages which foremost may be associated with a device according to the present invention are that each local control unit having a storage unit associated therewith acts independently, time-critical handling between units being avoided, and that a number of storage units and the internal configurations thereof freely may be varied without major interference in the system.

BRIEF DESCRIPTION OF THE DRAWINGS

A device having the properties associated with the present invention will now be closer described for the purpose of exemplifying, reference being made to the accompanying drawing wherein.

DESCRIPTION OF PRESENTLY PROPOSED EMBODIMENTS

Figure 1:
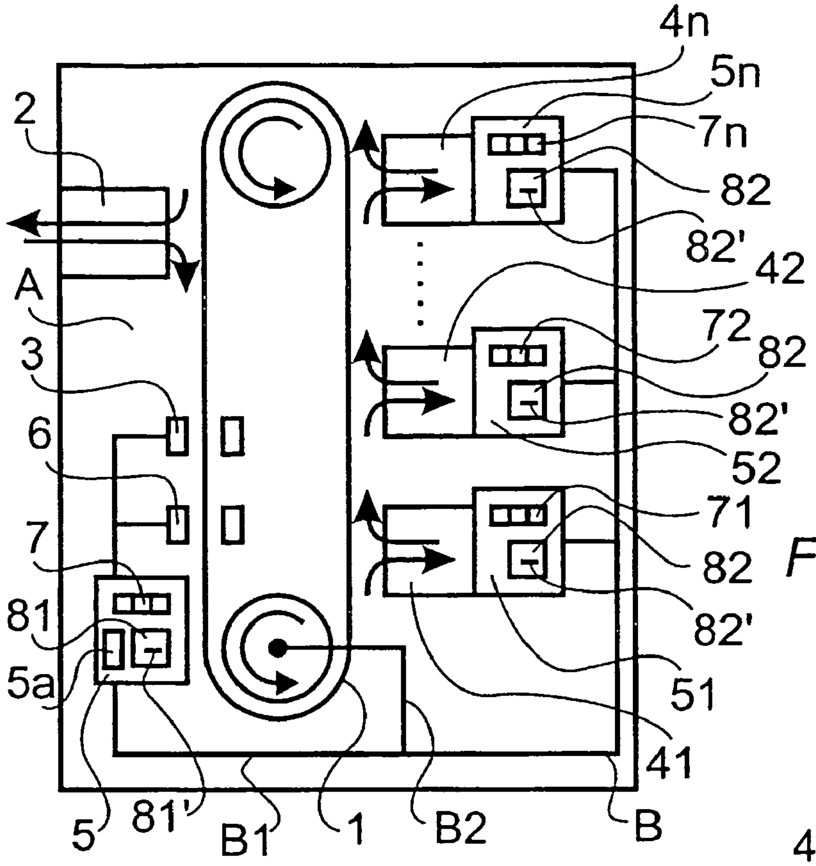
FIG. 1 schematically and very simplified shows a first embodiment of the present invention, FIG. 2 schematically and very simplified shows a second embodiment of the present invention, FIG. 3 schematically shows how values of positions are communicated upon update and initiation, FIG. 4 schematically shows how relative values of positions are communicated upon indication of the position of a transported banknote.

Reference being made to FIG. 1, a device A for handling banknotes, comprising a transporting system 1, an infeeding and outfeeding unit 2 arranged along the transporting system 1, which unit is adapted to the infeed and outfeed of banknotes, an identifying unit 3 arranged along the transporting system 1, as well as a first, second and so on to a last storage unit 41, 42, . . . , **4*n***, being arranged along the transporting system, each one adapted to the storage of banknotes, should accordingly be described.

It should be appreciated that the transporting system 1, the infeeding and outfeeding unit 2 and the respective storage unit 41, 42, . . . , **4*n*** may just from a mechanical point of view be realised in various ways. For instance, each unit may be composed of an infeeding unit and an outfeeding unit. However, the present invention is not depending on this and it should be appreciated that the following description of the mechanical part of the device only is for the purpose of exemplifying in order to facilitate the understanding of the present invention.

The respective storage unit 41, 42, . . . , **4*n*** is adapted to store banknotes of a certain denomination and currency and the number of storage units is depending on how many currencies and denominations, respectively, that the device A should be able to handle. One of the objects of the invention is that the device readily should be able to be adapted to those currencies and denominations that a user want to be able to handle, among other things by the fact that the device readily can be rescaled by adding or removing storage units.

The device A is adapted to an infeed of a banknote through the infeeding and outfeeding unit 2, a transportation of the banknote by means of the transporting system 1 past the identifying unit 3. An identification of the banknote takes place by means of the identifying unit 3, and then the banknote is transported to a storage unit intended for the banknote according to the identification where the banknote is fed into the intended storage unit from the transporting system.

The present invention teaches particularly that the device A comprises a central control unit 5, adapted to, by means of a communication system B, communicate with a first local control unit 51 arranged at the first storage unit 41, a second local control unit 52 arranged at the second storage unit 42 and so on to a last local control unit **5*n* arranged at the last storage unit 4*n***.

Furthermore, the central control unit 5 is adapted to communicate with a position sensor 6, as well as the identifying unit 3.

The central control unit 5 and the respective local control unit 41, 42, . . . , **4*n*** have a common synchronous apprehension of the position of the transporting system.

When the identifying unit 3 has identified a banknote, and when the position of the banknote in the transporting system 1 is established by the position sensor 6, the central control unit 5 communicates the position of the banknote to the local control unit intended for the identified banknote, here exemplified by the second storage unit 42 having the second local control unit 52 associated therewith. The figure shows that the identifying unit 3 is located before the position sensor 6 in the direction of the transporting system 1. However, it should be appreciated that the mutual order between these components is not crucial to the function of the invention.

The intended local control unit 52 directs the storage unit 42 associated therewith to an infeed, being independent of other units, of the banknote from the transporting system 1 to the storage unit 42 when the banknote reaches the intended storage unit 42.

The present invention teaches that the communication between the central control unit 5 and intended local control unit 42 takes place before the banknote reaches the first storage unit 41 in order to guarantee that intended storage unit, even the first storage unit 41, should have time to get information about that the arriving banknote should be stored before the banknote reaches the storage unit.

An outfeed of a banknote from the device takes place by the fact that the central control unit 5 is adapted to communicate to the local control unit associated with the storage unit that stores the banknote, here exemplified by the first storage unit 41 and the first local control unit 51 associated therewith, that a banknote should be fed out to the transporting system 1.

The local control unit 51 directs the storage unit 41 associated therewith to an outfeed of the banknote to the transporting system, and then it is transported by means of the transporting system 1 to the infeeding and outfeeding unit 2, which feeds out the banknote from the transporting system 1 and out of the device A.

A banknote may be damaged somehow, or two banknotes may be fed in so they overlap each other. It may also be the case that two or more banknotes are fed in entirely overlapping each other so that they visually seen look like one banknote. In that case, the identifying unit 3 can be adapted to, from the thickness of what is regarded to be one banknote, sense that it in effect is two or more banknotes.

Thus, there may be situations where the identifying unit 3 is incapable of identifying a fed-in banknote with a particular certainty.

On that occasion, the present invention teaches that the banknote should be transported by means of the transporting system 1 to the infeeding and outfeeding unit 2, which feeds out the unidentified banknote from the transporting system 1 and out of the device A.

According to a proposed embodiment of the present invention, the infeeding and outfeeding unit 2 is adapted to feed in each banknote to the transporting system 1 that is inserted in device A, and to feed out each banknote from the transporting system 1 that, by means of the transporting system 1, reaches the infeeding and outfeeding unit 2.

According to the same embodiment, the transporting system 1 could be able to reverse back a banknote past the identifying unit 3 for at least one additional transportation of the banknote past the identifying unit 3 for identification before the identifying unit 3 is regarded to be incapable of identifying the banknote.

Figure 2:
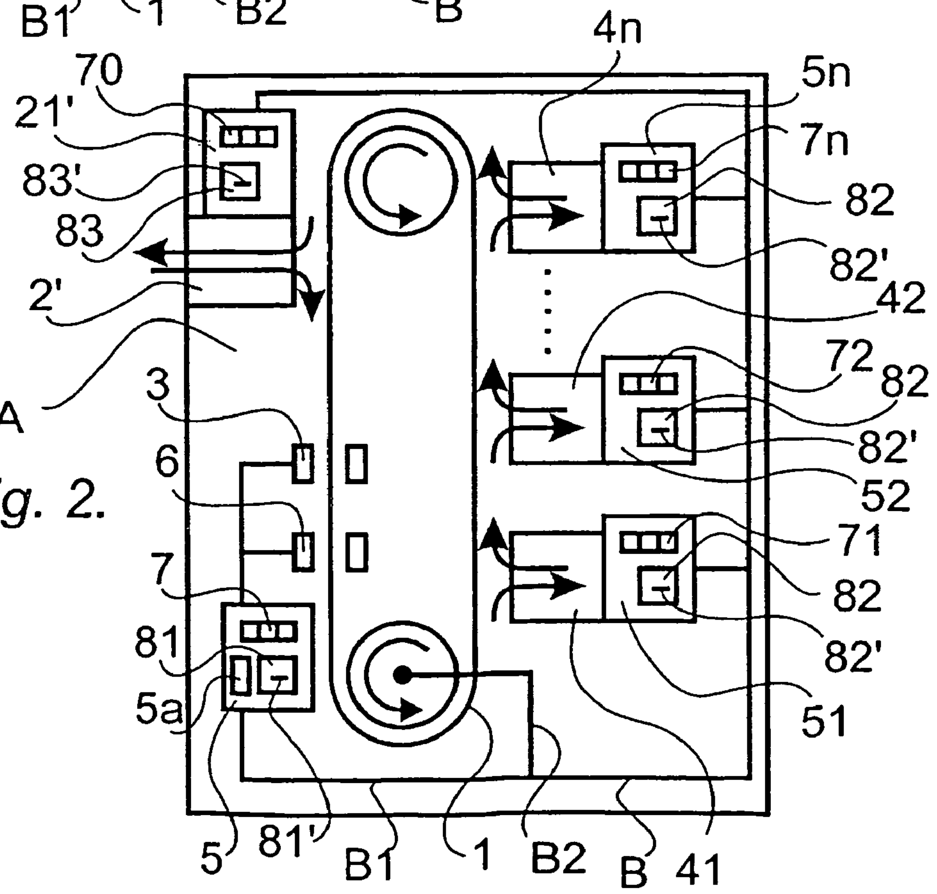

According to another proposed embodiment of the present invention, shown schematically and simplified in FIG. 2, an infeeding and outfeeding control unit 21' is adapted to communicate with the central control unit 5, arranged at the infeeding and outfeeding unit 2'. The infeeding and outfeeding control unit 21' has an apprehension of the position of the transporting system 1 that is common to and synchronous with other control units 5, 51, 52, . . . , 5*n*.

Upon an outfeed of a banknote from the device A, the central control unit 5 is adapted to communicate to the local control unit 51 associated with the storage unit 41 that stores the banknote and to the infeeding and outfeeding control unit 21' a position of the banknote in the transporting system. The local control unit 51 directs storage unit 41 associated therewith to an outfeed of the banknote to the transporting system 1 at the given position. By means of the transporting system 1, the banknote is then transported to the infeeding and outfeeding unit 2', and the infeeding and outfeeding control unit 21' directs the infeeding and outfeeding unit 2' to an outfeed of banknote from the transporting system 1 and out of the device A in the position.

According to the same embodiment, a banknote can be permitted to be transported around a plurality of turns, and accordingly a plurality of times past the identifying unit 3, for identification before the identifying unit 3 is regarded to be incapable of identifying the banknote.

Said embodiment also offers a possibility of adapting the central control unit 5, upon an infeed of a banknote to the transporting system 1 by means of the infeeding and outfeeding unit 2', to communicate a position of the infeed to the transporting system 1 to the infeeding and outfeeding control unit 21', and then the infeeding and outfeeding control unit 21' directs the infeeding and outfeeding unit 2' to an infeed of the banknote into the device A and to the transporting system 1 in this position.

The present invention also teaches that, according to this latter embodiment, but also according to previously described embodiments, the central control unit 5 comprises a central index 5*a*, which comprises a record of each position associated with the transporting system 1, which index contains information about whether the respective position in the transporting system 1 carries a banknote or not. This entails a greater possibility of controlling where banknotes are in the transporting system 1, which may be particularly advantageous in the latter embodiment including an active control of where in the transporting system a banknote may be fed in through the infeeding and outfeeding unit.

The present invention teaches that the transporting system is allocated positional locations of a mutual distance that in any position permits a transportation of at least a banknote being largest in physical size of the banknotes that may be present in the handling of banknotes.

With the intention of preventing mechanical wear of the banknotes, the present invention teaches that said infeeding and outfeeding unit 2 and the respective storing unit 41, 42, . . . , 4*n* are adapted to an infeed and outfeed of banknotes taking place synchronously with the motion of the transporting system 1.

In order to be able to carry out a certain quality control, the present invention teaches that the central control unit 5 is adapted to be able to read the apprehension of the respective local control unit 51, 52, . . . , 5*n* and of the possible infeeding and outfeeding control unit 21' regarding the position of the transporting system 1.

This reading may constitute a part of a performance inspection carried out upon a stationary transporting system 1.

According to the present invention, an initiation of the device A can be effected by the fact that the central control unit 5 is adapted to communicate a reference position of the transporting system 1 to all other control units 51, 52, . . . , 5*n* (21') upon a stationary transporting system.

An update of the device A can be effected by the fact that a current position of the transporting system 1 is communicated to all control units 5, 51, 52, . . . , 5*n* (21') upon a new position of the transporting system, where said current position can be communicated upon a transporting system 1 in motion, and where the communication takes place autonomously.

Figure 3:
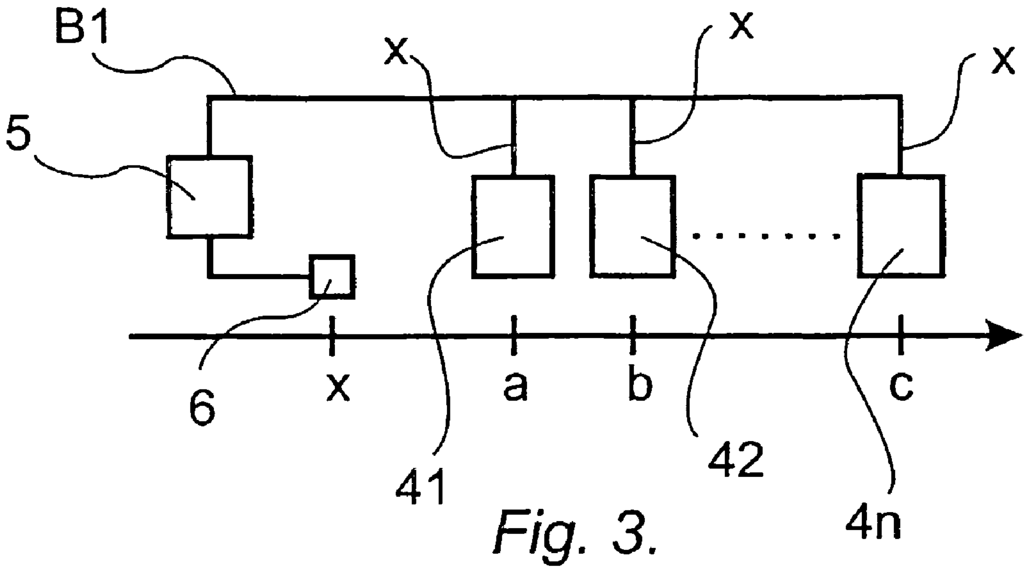

In FIG. 3, it is shown that the central control unit 5 is adapted to communicate the identical numerical value x of the position of said transporting system to all local control units upon the initiation and update.

Figure 4:
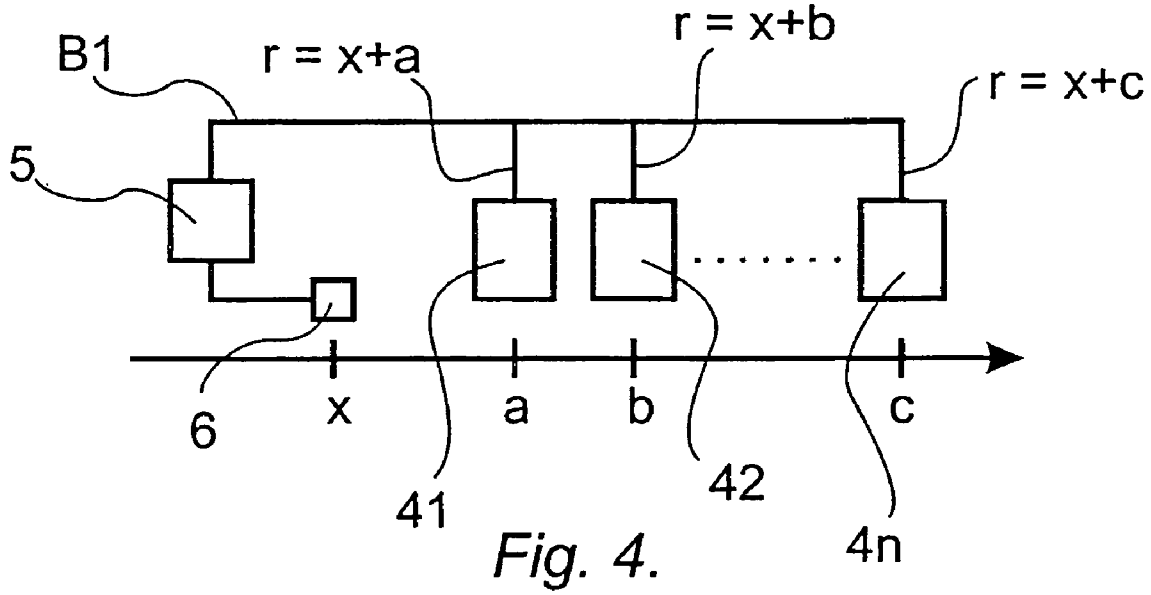

FIG. 4 shows that the central control unit 5 is adapted to calculate and communicate relative position readings r adapted to the respective local storage unit 41, 42, . . . , 4*n* upon the indication of the position of a banknote in the transporting system 1. Here, it is shown that if the first storage unit 41 is positioned at the distance a from the position sensor 6, the central control unit 5 calculates the relative position r=x+a and communicates this value to the local control unit 51 for an infeed of a banknote when the transporting system 1 is in the position r. In the same way, the relative values r=x+b, and so on to r=x+c are calculated and sent to the different local control units. It should also be appreciated that upon the existence of an infeeding and outfeeding unit 2', also a relative value is calculated and communicated to this unit for an outfeed of a banknote from the correct position of the transporting system.

The present invention teaches that the central control unit 5 communicates with other control units 51, 52, . . . , 5*n* (21') by means of a common data link B1 having low bandwidth requirements, which may constitute a part of the communication system B.

The present invention further teaches that the respective control unit 5, 51, 52, . . . , 5*n* (21') comprises an index 7, 71, 72, . . . , 7*n*, (70) that is adapted to be incremented in order to always represent the current position of the transporting system 1, that the respective index is adapted to handle positions that exceed a number of turns around the transporting system 1, that, when the respective index is incremented from the maximum value thereof, the respective index gets the value of 0 (zero), and that all calculations are made modulo the maximum value of the respective index+1, whereby position distances above wrap around do not constitute any problem.

Furthermore, the present invention teaches that the instantaneous position of the transporting system 1 in operation is communicated to the respective control unit 5, 51, 52, . . . , 5*n* (21') by means of a transfer mechanism B2 adapted to utilize two signals in quadrature, and that a third signal is used for the zero setting of the respective index upon an initiation of the device. The figures show that the transfer mechanism B2 constitutes a part of the physical communication system B, but it should be appreciated that the transfer mechanism B2 is logically separated from the data link B1. It should also be appreciated that the data link B1 and the transfer mechanism B2 can be realised by two communication systems separated from each other.

The present invention also relates to a number of computer programme products. A first computer programme product 81 comprises computer programme code 81' that, when it is executed by a computer, brings the same computer to act as a central control unit according to the invention.

A second computer programme product 82 comprises computer programme code 82' that, when it is executed by a computer, brings the same computer to act as a local control unit according to the invention.

A third computer programme product 83 comprises computer programme code 83' that, when it is executed by a computer, brings the same computer to act as an infeeding and outfeeding control unit according to the invention.

Figure 5:
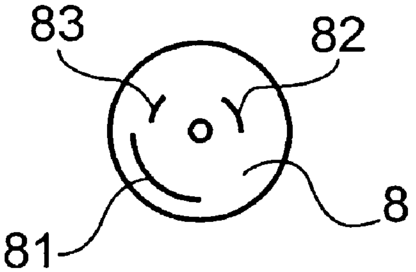
FIG. 5 shows a computer-readable medium, schematically shown as a CD, on which computer programme code is stored.

Furthermore, the present invention relates to a computer-readable medium 8, schematically shown as a CD in FIG. 5, on which computer programme code 81', 82', 83' according to the first, second or third computer programme product 81, 82, 83 is stored.

The invention is of course not limited to the embodiments given above as examples but may be subjected to modifications within the scope of the general idea according to the invention such as this is illustrated in the subsequent claims.

The invention claimed is:

1. A device for handling banknotes comprising: a transporting system, an infeeding and outfeeding unit arranged along said transporting system, which unit is adapted to the infeed and outfeed of banknotes, an identifying unit arranged along said transporting system, as well as a first, second and so on until an nth storage unit, wherein n is greater than 2, being arranged along said transporting system, each one adapted to the storage of banknotes, with said device being adapted to an infeed of a banknote through said infeeding and outfeeding unit, a transportation of said banknote by means of said transporting system past said identifying unit, an identification of said banknote by means of said identifying unit, a transportation of said banknote to a storage unit intended for said banknote according to said identification, as well as an infeed of said banknote to said intended storage unit from said transporting system, wherein said device comprises a central control unit adapted to communicate with a first local control unit arranged at said first storage unit, a second local control unit arranged at said second storage unit and so on an nth local control unit arranged at said nth storage unit, a position sensor, as well as said identifying unit, wherein said central and the respective local control unit have a common synchronous apprehension of the position of said transporting system, wherein, when said identifying unit has identified a banknote, before said banknote reaches the first storage unit, and when said position sensor has established the position of the banknote in said transporting system, said central control unit communicates the position of said banknote to the local control unit intended for said identified banknote, and wherein said intended local control unit directs the storage unit associated therewith to an infeed, being independent of other units, of said banknote from said transporting system to said storage unit when the position of said banknote in the transporting system reaches said intended storage unit as said transporting system moves said banknotes.

2. The device according to claim 1, wherein the communication between said central control unit and intended local control unit takes place before said banknote reaches said first storage unit.

3. The device according to claim 1, wherein upon an outfeed of a banknote from said device, said central control unit is adapted to communicate to the local control unit associated with the storage unit that stores said banknote that said banknote should be fed out to said transporting system, wherein said local control unit directs the storage unit associated therewith to an outfeed of said banknote to said transporting system, wherein said banknote is transported by means of said transporting system to said infeeding and outfeeding unit, and wherein said infeeding and outfeeding unit feeds out said banknote from said transporting system and out of said device.

4. The device according to claim 3, wherein, if said identifying unit is incapable of identifying a fed-in banknote with a particular certainty, said banknote is transported by means of said transporting system to said infeeding and outfeeding unit, and wherein said infeeding and outfeeding unit feeds out said unidentified banknote from said transporting system and out of said device.

5. The device according to claim 3, wherein said infeeding and outfeeding unit is adapted to feed in each banknote that is inserted in said device to said transporting system, and to feed out each banknote from said transporting system that by means of said transporting system reaches said infeeding and outfeeding unit.

6. The device according to claim 5, wherein said transporting system reverses back said banknote past said identifying unit for at least one additional transportation past said identifying unit for identification before said identifying unit is regarded to be incapable of identifying said banknote.

7. The device according to claim 3, wherein an infeeding and outfeeding control unit, adapted to communicate with said central control unit, is arranged at said infeeding and outfeeding unit, wherein said infeeding and outfeeding control unit has an apprehension of the position of said transporting system that is common to and synchronous with other control units, wherein upon an outfeed of a banknote from said device, said central control unit is adapted to communicate to the local control unit associated with the storage unit that stores said banknote and to said infeeding and outfeeding control unit a position of said banknote in said transporting system, wherein said local control unit directs the storage unit associated therewith to an outfeed of said banknote to said transporting system in said position, wherein said banknote is transported by means of said transporting system to said infeeding and outfeeding unit, and wherein said infeeding and outfeeding control unit directs said infeeding and outfeeding unit to an outfeed of said banknote from said transporting system and out of said device in said position.

8. The device according to claim 7, wherein a banknote is permitted to be transported around a plurality of turns, and accordingly a plurality of times past said identifying unit, for identification before said identifying unit is regarded to be incapable of identifying said banknote.

9. The device according to claim 8, wherein said central control unit, upon an infeed of a banknote to said transporting system by means of said infeeding and outfeeding unit, is adapted to communicate a position of said infeed to said transporting system to said infeeding and outfeeding control unit, and wherein said infeeding and outfeeding control unit directs said infeeding and outfeeding unit to an infeed of said banknote into said device and to said transporting system in said position.

10. The device according to claim 3, wherein said central control unit comprises a central index, which comprises a record of each position associated with said transporting system, and wherein said index contains information about whether the respective position in the transporting system carries a banknote or not.

11. The device according to claim 3, wherein said transporting system is allocated positional locations of a mutual distance that in any position permits a transportation of at least a banknote being largest in physical size of the banknotes that may be present in said banknote handling.

12. The device according to claim 3, wherein said infeeding and outfeeding unit and the respective storing unit are adapted to an infeed and outfeed of banknotes taking place synchronously with the motion of said transporting system.

13. The device according to claim 3, wherein said central control unit is adapted to be able to read the apprehension of the respective local control unit, and of said ingoing and outgoing control unit upon the presence of such a one, regarding the position of said transporting system.

14. The device according to claim 13, wherein said reading constitutes a part of a performance inspection carried out upon a stationary transporting system.

15. The device according to claim 3, wherein an initiation of said device can take place by the fact that said central control unit is adapted to communicate a reference position of said transporting system to all other control units upon a stationary transporting system.

16. The device according to claim 3, wherein an update of said device can take place by the fact that a current position of said transporting system is communicated to all control units upon a new position of said transporting system, wherein said current position can be communicated upon a transporting system in motion, and wherein said communication takes place autonomously.

17. The device according to claim 16, wherein said central control unit is adapted to communicate the identical numerical value of the position of said transporting system to all local control units upon said initiation and said update, and wherein said central control unit is adapted to calculate and communicate relative position readings adapted to the respective local storage unit upon the indication of the position of a banknote in said transporting system.

18. The device according to claim 3, wherein said central control unit communicates with other control units by means of a common data link having low bandwidth requirements.

19. The device according to claim 3, wherein the respective control unit comprises an index, which is adapted to be incremented in order to always represent the current position of said transporting system, wherein the respective index is adapted to handle positions that exceed a number of turns around said transporting system, wherein when the respective index is incremented from the maximum value thereof, the respective index gets the value of 0 (zero), and wherein all calculations are made modulo the maximum value of the respective index+1.

20. The device according to claim 3, wherein an initiation of said device can take place by the fact that said central control unit is adapted to communicate a reference position of said transporting system to all other control units upon a stationary transporting system, the respective control unit comprises an index, which is adapted to be incremented in order to always represent the current position of said transporting system, wherein the respective index is adapted to handle positions that exceed a number of turns around said transporting system, wherein when the respective index is incremented from the maximum value thereof, the respective index gets the value of 0 (zero), and wherein all calculations are made modulo the maximum value of the respective index+1, and wherein the instantaneous position of said transporting system in operation is communicated to the respective control unit by means of a transfer mechanism adapted to utilize two signals in quadrature, and wherein a third signal is used for the zero setting of the respective index upon an initiation of said device.

* * * * *